Oct. 25, 1955  F. F. LAPHAM ET AL  2,721,760
RETRACTABLE MUD GUARD
Filed Jan. 5, 1952
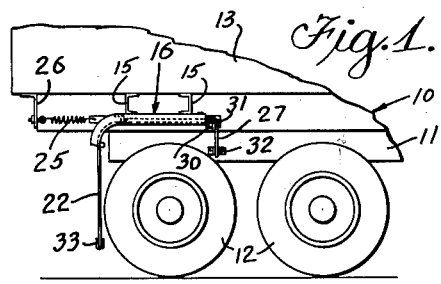
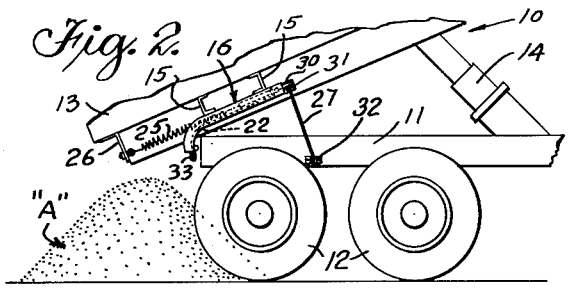
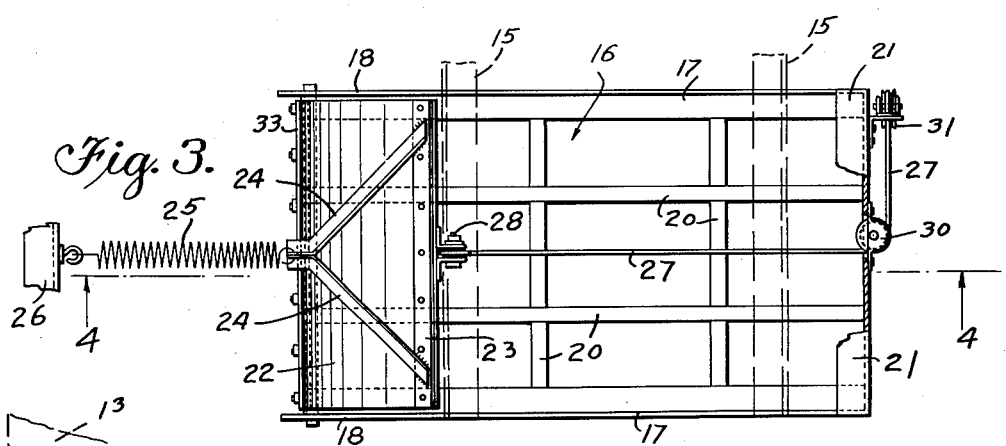
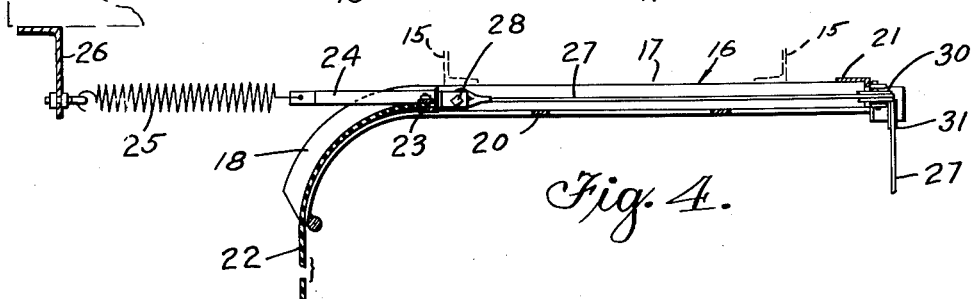
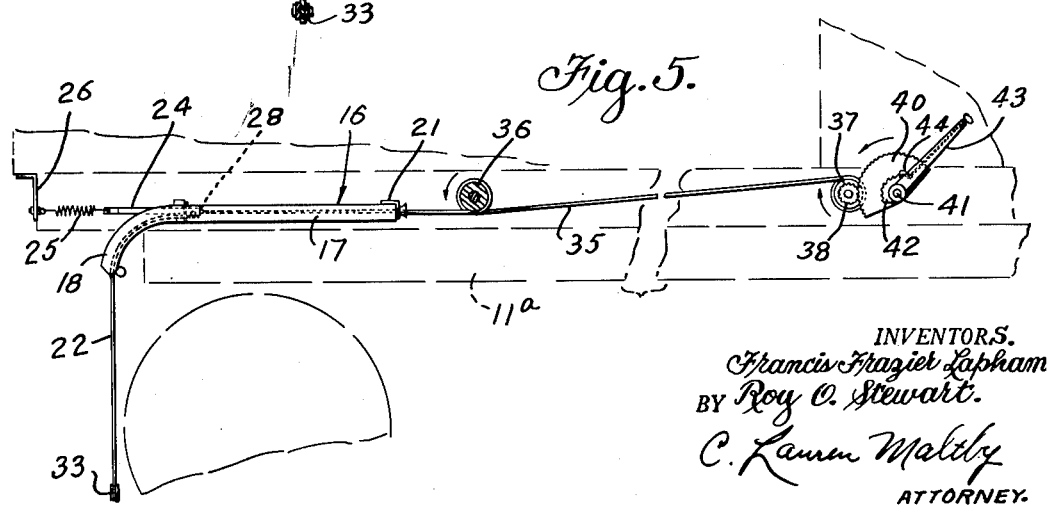
INVENTORS.
Francis Frazier Lapham
BY Roy O. Stewart.
C. Lauren Maltby
ATTORNEY.

United States Patent Office 2,721,760
Patented Oct. 25, 1955

2,721,760

RETRACTABLE MUD GUARD

Francis Frazier Lapham and Roy O. Stewart,
San Bernardino, Calif.

Application January 5, 1952, Serial No. 265,114

6 Claims. (Cl. 298—1)

This invention relates to vehicles and more especially to a mud guard therefor, particularly for trucks which handle material.

The present invention is directed particularly to material handling road vehicles, such as dump trucks or similar vehicles that handle cement, gravel, dirt and the like, and the invention is for a mud guard for the rear wheels of such vehicles which guards, as presently constructed, consist of a plate or flexible flap hanging downwardly from the truck frame or body in such manner that when the material is dumped from the truck, the material packs around the mud guard in such a way that the guard is often damaged or torn loose when the truck pulls away from the pile of dumped material. The present invention has been developed to overcome the disadvantages of present type guards by the provision of a guard that is retractable from its normal guard position, so as to be free from the pile of dumped material and is not damaged thereby.

It is therefore an object of the invention to provide a novel and improved mud guard for material handling vehicles wherein the guard is retractable at the time the load is dumped.

A more particular object of the invention is to provide a retractable guard of the character described that is automatically retracted when the body of the vehicle is tilted for dumping the load.

Another particular object of the invention is to provide a guard of the character described that can be shifted to retracted position by manipulation from the operator of the vehicle.

Other objects and advantages will appear and be brought out more fully in the following specification, reference being had to the accompanying drawing wherein;

Figure 1 is a fragmentary side elevation view of a dump truck vehicle, showing the invention in association therewith.

Figure 2 is a view similar to Figure 1, showing the body of the truck in tilted position and the mud guard in retracted position.

Figure 3 is a top plan view of the retractable mud guard shown in Figures 1 and 2.

Figure 4 is a sectional view taken along the line 4—4 of Figure 3.

Figure 5 is a side elevation view of a modified form of the invention.

Referring more particularly to the drawing, the numeral 10 designates a vehicle, such as a dump truck for handling cement, gravel, sand and similar materials, the vehicle having a frame 11, rear wheels 12, and a body 13, provided with a jack 14 for tilting the body to dumping position as shown in Figure 2. The body 13 has at each side a pair of laterally extending brackets 15 which may be channel irons or the like.

The mud guard of this invention is designated generally at 16 and comprises a pair of side frame members 17, which may be angle irons welded or otherwise secured to the brackets 15. Side members 17 have downwardly curved ends 18 and a plurality of auxiliary crossed braces 20 comprise a web and are secured to side members 17. An angle member 21 is secured at the forward end of side members 17.

The numeral 22 designates the mud guard element itself, which comprises a generally rectangular flexible sheet of any suitable material, such as a composition of vulcanized fabric or it may be sheet metal as desired. The sheet 22 is supported generally by the frame 16 and the side edges of the guard are guided by the vertical flanges of side members 17. The upper forward end of the guard 22 is suitably secured to a cross member 23 and a yoke 24 extends rearwardly from member 23 and is secured to one end of a coiled spring 25, the other end of which is secured to a bracket 26 fastened to the end of the vehicle body 13.

A cable chain or cord 27 has one end thereof suitably secured at 28 to cross member 23 and is carried over a pair of guide pulleys 30 and 31 mounted at the forward end of frame 17 and the forward end of the cable element 27 is fastened at 32 to the frame 11 of the vehicle 10. A bar or other suitable weight 33 is fastened to the downwardly extending rear end of guard 22 for maintaining the guard in normal position at the rear of the rear wheel 12 of vehicle as seen in Figure 1.

The operation of the invention should be clear from the foregoing description. The mud guard 22 is in normal or guard position as shown in Figures 1, 3 and 4, being held in such position by spring 25 and weights 33. Figure 2 shows the truck body 13 as having been tilted by jack 14 and having dumped its load indicated at A on the ground in a generally conical pile. During the tilting movement of body 13, the distance between pulley 31 and fastener 32 will have been increased and this movement has the effect of a pull on cable 27, as a result of which guard 22 will be drawn upwardly and forwardly along frame 16 so that the lower end 33 of the guard will be free and clear of the material A which has been dumped and would otherwise have at least partially embedded the guard therein with possible damaging results. When the truck body 13 is lowered to the position of Figure 1, the spring 25 and weight 33 will pull the guard rearwardly and downwardly to the original position.

In Figure 5 is shown a guard structure and mounting by which the guard is manually shifted to non-guard position by manipulation by the operator of the vehicle. In this figure the guard structure is generally similar to that of Figures 1 to 4. However, the cable is designated at 35 and is carried around the drum 36 and the forward end is carried around and secured to a drum 37, the drums having suitable bearing mountings on the frame 11a of a vehicle which need not have a dump body. The shaft which carries drum 37 has a pinion gear 38 thereon which meshes with the teeth of a sector gear 40 mounted on a shaft 41 which also mounts a sector plate 42 having ratchet teeth. An operating lever 43 has a dog 44 for engaging ratchet teeth 42.

In this form of the invention, the operator at will by manipulation of a lever 43 causes drum 37 to be turned, thus raising the guard to non-guard position similar to that shown in Figure 2. The operator can release the guard by release of dog 44 from ratchet teeth 42 and the guard will be retracted as before.

It will be understood that the foregoing description is illustrative rather than restrictive of the invention and that changes and modifications may be made without departing from the spirit and scope of the subjoined claims.

We claim:

1. In a road vehicle having a frame a tiltable body and a road wheel the combination of a mud guard movably mounted to the body adjacent the wheel, means normally retaining said guard in guard position, and means for moving said guard from guard position to non-guard position, said first means comprising a spring interconnecting said guard and said body, said last means including a cable connected between said guard and said frame adapted to be tensioned when said body is tilted.

2. In a road vehicle having a frame and a road wheel the combination of a guideway mounted to said frame, externally of the periphery of said wheel, a substantially flat mud guard longitudinally shiftably mounted to said guideway and having an end portion positioned normally behind said wheel, means interconnecting said frame and guard to retain said guard in such position, and link means interconnecting said frame and guard to shift said guard in said guideway so that said end portion is retracted from said normal position.

3. In a road vehicle having a frame and a road wheel the combination of a guideway mounted to said frame, externally of the periphery of said wheel, a substantially flat mud guard longitudinally shiftably mounted to said guideway and having an end portion positioned normally behind said wheel, resilient means interconnecting said frame and guard to retain said guard in such position, and manually actuatable link means interconnecting said frame and guard to shift said guard in said guideway so that said end portion is retracted from said normal position.

4. In a road vehicle having a frame and a road wheel the combination of a guideway mounted to said frame, externally of the periphery of said wheel, a substantially flat mud guard longitudinally shiftably mounted to said guideway and having an end portion positioned normally behind said wheel, resilient means interconnecting said frame and guard to retain said guard in such position, and means to shift said guard in said guideway so that said end portion is retracted from said normal position, said last means including a cable secured at one end to said guard and means on said frame for tensioning said cable.

5. In a road vehicle having a frame, a tiltable body and a road wheel the combination of a guideway mounted to said frame body, externally of the periphery of said wheel, a substantially flat mud guard longitudinally shiftably mounted to said guideway and having an end portion positioned normally behind said wheel, resilient means interconnecting said frame and guard to retain said guard in such position, and means to shift said guard in said guideway so that said end portion is retracted from said normal position, said last means including a cable secured to said guard and means on said body for tensioning said cable when said body and frame is tilted.

6. In a road vehicle having a frame and a road wheel the combination of a guideway mounted to said frame, externally of the periphery of said wheel, a substantially flat mud guard longitudinally shiftably mounted to said guideway and having an end portion positioned normally behind said wheel, resilient means interconnecting said frame and guard to retain said guard in such position, and means to shift said guard in said guideway so that said end portion is retracted from said normal position, said last means including a cable secured at one end to said guard and lever actuated means on said frame for tensioning said cable.

References Cited in the file of this patent

UNITED STATES PATENTS

| 1,535,444 | Anderson | Apr. 28, 1925 |
| 2,414,676 | Taurman et al. | Jan. 21, 1947 |

FOREIGN PATENTS

| 280,367 | Great Britain | Nov. 17, 1927 |